United States Patent
Docimo

(10) Patent No.: US 9,388,851 B1
(45) Date of Patent: Jul. 12, 2016

(54) SPLIT CYLINDRICAL ROLLER BEARING

(71) Applicant: Schaeffler Technologies GmbH & Co. KG, Herzogenaurach (DE)

(72) Inventor: Rocco Docimo, Stamford, CT (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1 day.

(21) Appl. No.: 14/580,128

(22) Filed: Dec. 22, 2014

(51) Int. Cl.
  F16C 23/08    (2006.01)
  F16C 33/60    (2006.01)
  F16C 19/26    (2006.01)
  F16C 35/07    (2006.01)
  F16C 35/067   (2006.01)

(52) U.S. Cl.
  CPC ............ F16C 23/084 (2013.01); F16C 19/26 (2013.01); F16C 33/60 (2013.01); F16C 35/067 (2013.01)

(58) Field of Classification Search
  CPC ........ F16C 19/24; F16C 23/084; F16C 33/46; F16C 33/583; F16C 33/60; F16C 33/605; F16C 33/63; F16C 35/067
  USPC ......... 384/499, 500–502, 537, 558, 559, 560, 384/564, 586, 570, 572, 585
  See application file for complete search history.

(56) References Cited

U.S. PATENT DOCUMENTS

| | | | | |
|---|---|---|---|---|
| 2,528,987 A | * | 11/1950 | Albett | C10K 1/121 384/570 |
| 3,166,363 A | * | 1/1965 | Kay | F16C 19/26 384/570 |
| 3,224,821 A | * | 12/1965 | Barr | F16C 13/02 384/499 |
| 3,304,140 A | * | 2/1967 | Hornigold | F16C 33/60 384/537 |
| 4,475,777 A | * | 10/1984 | Hofmann | F16C 23/086 384/572 |
| 4,537,519 A | * | 8/1985 | LaRou | F16C 35/063 384/478 |
| 4,671,682 A | * | 6/1987 | Yoshihara | F16C 19/26 384/480 |
| 4,733,977 A | * | 3/1988 | Eisenmann | B22D 11/1287 384/557 |
| 5,468,074 A | * | 11/1995 | Godec | F16C 23/084 384/495 |
| 5,927,864 A | * | 7/1999 | Feerick | F16C 23/084 384/482 |
| 6,905,249 B2 | * | 6/2005 | Schill | F16C 35/073 384/537 |
| 8,057,105 B2 | | 11/2011 | Earthrowl et al. | |
| 8,333,515 B2 | * | 12/2012 | Milliken | F16C 33/7806 384/558 |
| 8,616,778 B2 | * | 12/2013 | Takahashi | B22D 11/1287 384/476 |
| 2012/0211470 A1 | * | 8/2012 | Webster | B23H 9/00 29/898.067 |

FOREIGN PATENT DOCUMENTS

CN   202901019 U   4/2013

* cited by examiner

*Primary Examiner* — Marcus Charles
(74) *Attorney, Agent, or Firm* — Antun M. Peakovic

(57) ABSTRACT

A split cylindrical bearing assembly having a first split outer ring with an inner radial self-aligning feature aligning axially with a second split outer ring having an outer radial self-aligning feature, the second split outer ring having two sections that are fixedly assembled and circumferentially aligned. A split inner ring having two sections fixedly assembled and circumferentially aligned is assembled within and axially aligned with the second split outer ring, and a split cage retaining rolling elements disposed between the second split outer ring and the split inner ring. Also the split cylindrical bearing assembly assembled onto a shaft and into a housing assembly.

11 Claims, 7 Drawing Sheets

SPLIT CYLINDRICAL ROLLER BEARING

TECHNICAL FIELD

Example aspects described herein relate to bearing assemblies, particularly split ring bearing assemblies.

BACKGROUND

Bearing assemblies are typically circular in shape, and generally comprise rolling elements disposed between raceways in bearing rings. Rolling elements take many forms, including spherical balls, rollers or various other configurations, such as cone-shaped tapered rollers or barrel-shaped spherical rollers.

Bearing assemblies, for example for machinery, such as electric motors, gearboxes, high speed spindles, and turbines, are known to include a housing made of a first material and an outer race radially enclosed by the housing and made of a second material. The first material and the second material may also be the same material, for example steel or the two materials may be substantially similar materials such as bearing steel (bearing) and another ferrous metal (housing). In a typical shaft installation, there may be a fixed or press fit bearing to locate the assembly and a floating or loose fit bearing to allow for thermal expansion or contraction. In some other assemblies both bearings may be floating or loose fit, to allow for some axial displacement.

In machine shaft assemblies maintenance and replacement of bearings may be required. A bearing that can easily be assembled and disassembled onto shaft is desirable.

SUMMARY OF THE INVENTION

According to aspects illustrated herein, there is provided a bearing assembly, including: a first split outer ring including a first section having a first self aligning surface on an inner radial surface and a first mounting surface on an outer radial surface; a second section having a second self aligning surface on an inner radial surface and a second mounting surface on an outer radial surface; and, the first section and the second section at least partially circumferentially aligned such that the first self-aligning surface is at least partially circumferentially aligned with the second self-aligning surface and the first mounting surface is at least partially aligned with the second mounting surface; a second split outer ring assembled within the first split outer ring including: a first section having a first bearing raceway on an inner radial surface, a first self-aligning surface on an outer radial surface and at least two retention shoulders at opposite axial ends; a second section having a second bearing raceway on an inner radial surface, a second self-aligning surface on an outer radial surface and at least two retention shoulders at opposite axial ends; a plurality of fasteners joining the first section and the second section such that a first continuous bearing raceway, a first continuous self-aligning surface and at least two continuous retention shoulders are formed; and, the first continuous self-aligning surface at least partially aligned with the first split outer ring first and second self-aligning surfaces; a split inner ring axially aligned with the second split outer ring and assembled within the second split outer including: a first section having a first bearing raceway on an outer radial surface and a first shaft mounting surface on an inner radial surface; a second section having a second bearing raceway on an outer radial surface and a second shaft mounting surface on an inner radial surface; and a plurality of fasteners joining the first and second sections such that a second continuous bearing raceway is formed from the first and second section bearing raceways; and, a plurality of rolling elements retained by a cage and disposed between the second split outer ring and the split inner ring.

According to aspects illustrated herein, there is provided a bearing and housing assembly, including a housing with the above described bearing assembled within it, and a shaft clamped or pressed into the inner ring of the bearing.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
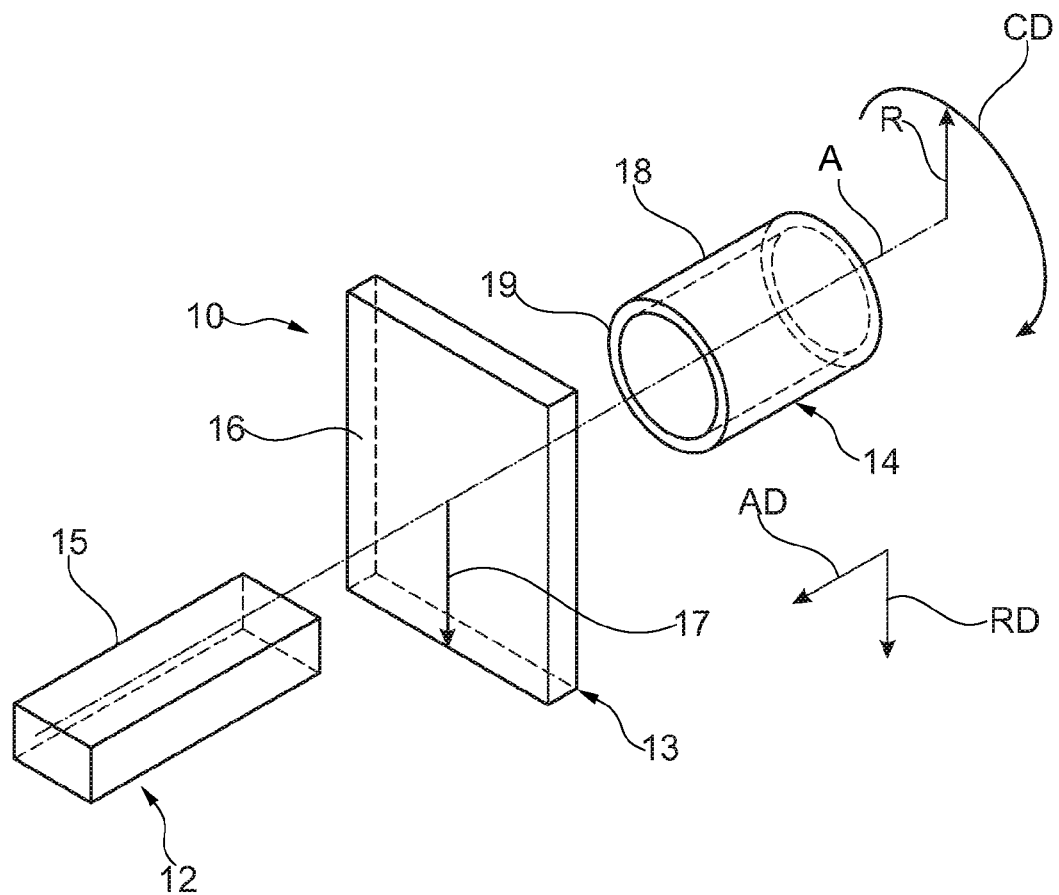
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis A, used as the reference for the directional and spatial terms that follow. Axial direction AD is parallel to axis 11. Radial direction RD is orthogonal to axis A. Circumferential direction CD is defined by an endpoint of radius R (orthogonal to axis A) rotated about axis A.

To clarify the spatial terminology, objects 12, 13, and 14 are used. An axial surface, such as surface 15 of object 12, is formed by a plane co-planar with axis A. Axis A passes through planar surface 15; however any planar surface co-planar with axis A is an axial surface. A radial surface, such as surface 16 of object 13, is formed by a plane orthogonal to axis A and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis A, radial movement is orthogonal to axis A, and circumferential movement is parallel to circumference 19. Rotational movement is with respect to axis A. The adverbs "axially," "radially," and "circumferentially" refer to orientations parallel to axis A, radius 17, and circumference 19, respectively. For example, an axially disposed surface or edge extends in direction AD, a radially disposed surface or edge extends in direction R, and a circumferentially disposed surface or edge extends in direction CD.

Figure 2:
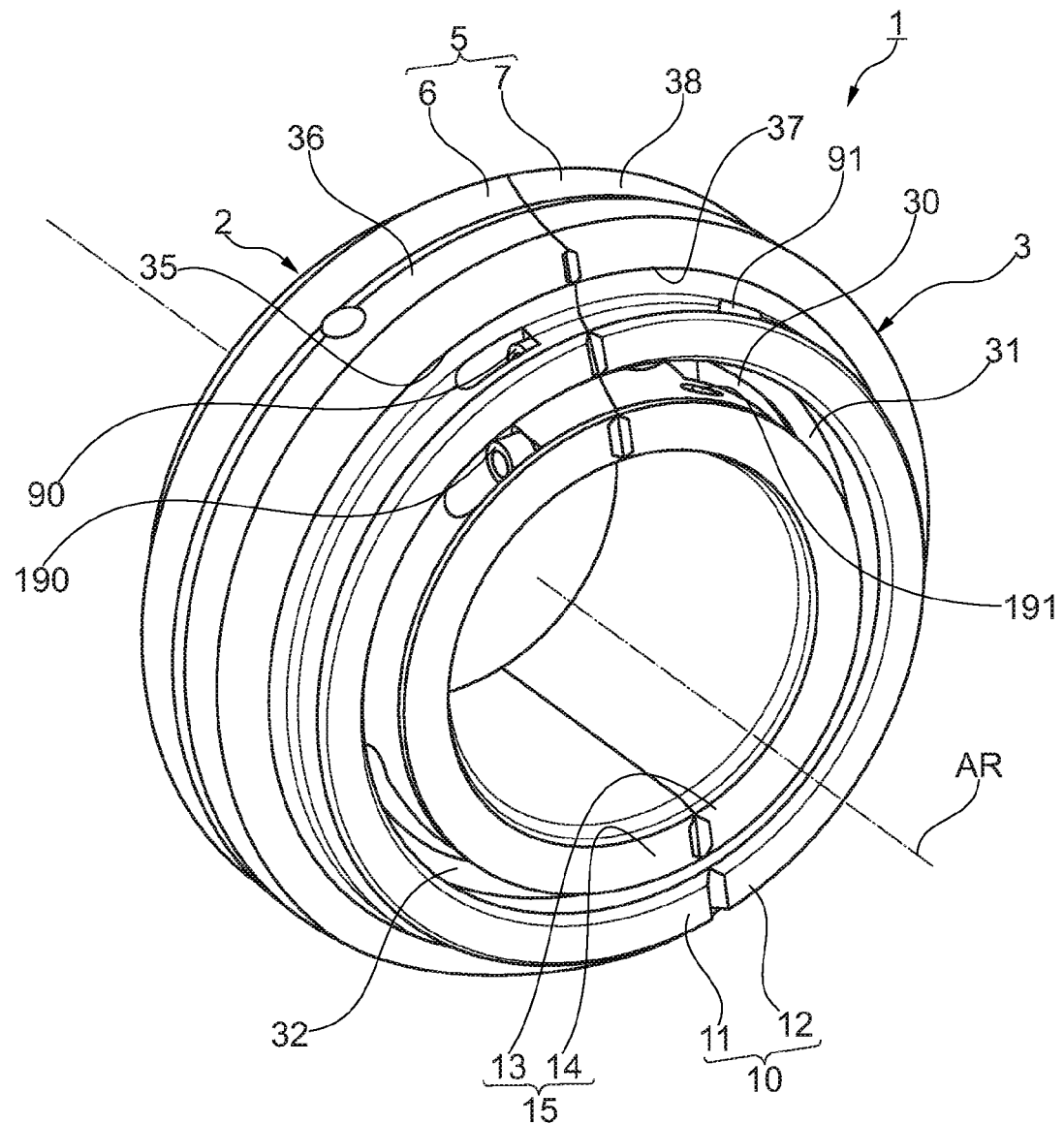
FIG. 2 is perspective view of a split ring bearing according to one example embodiment.
Figure 3:
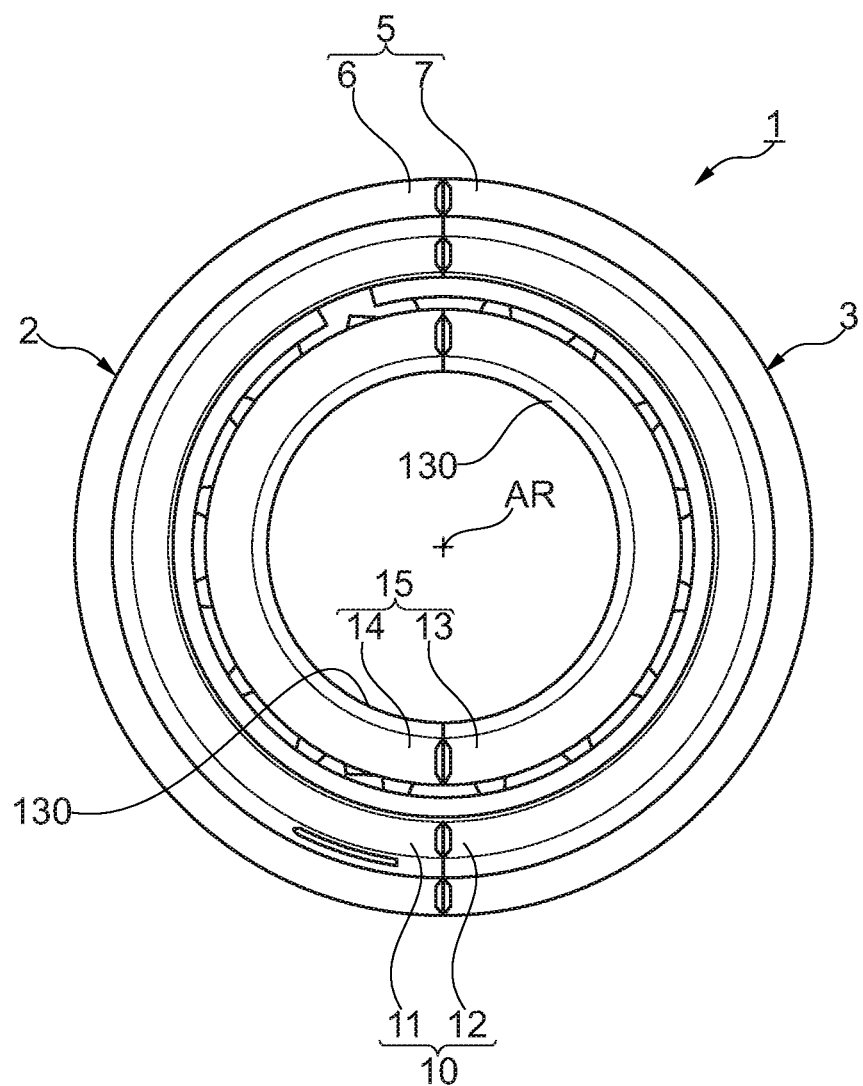
FIG. 3 is a front view of the bearing of FIG. 2.
Figure 4:
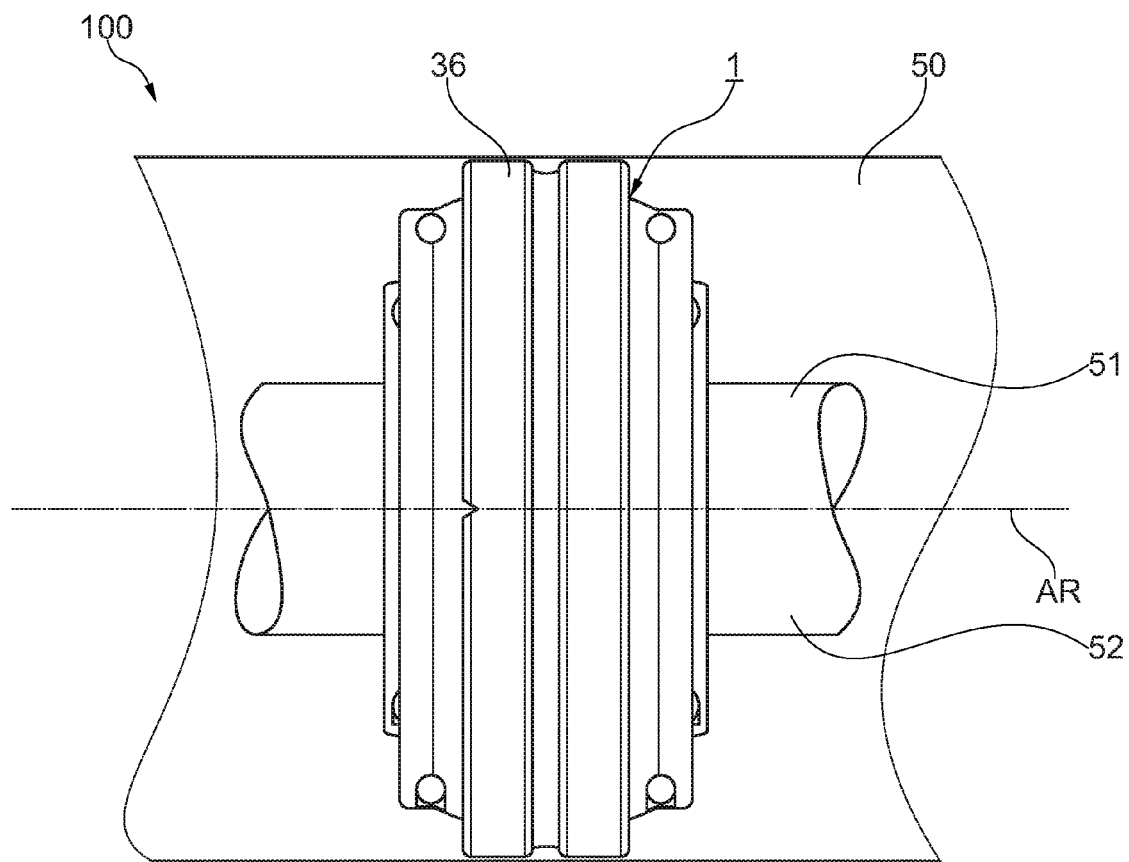
FIG. 4 is a side view of the bearing of FIG. 2 in an example housing and shaft assembly.
Figure 5:
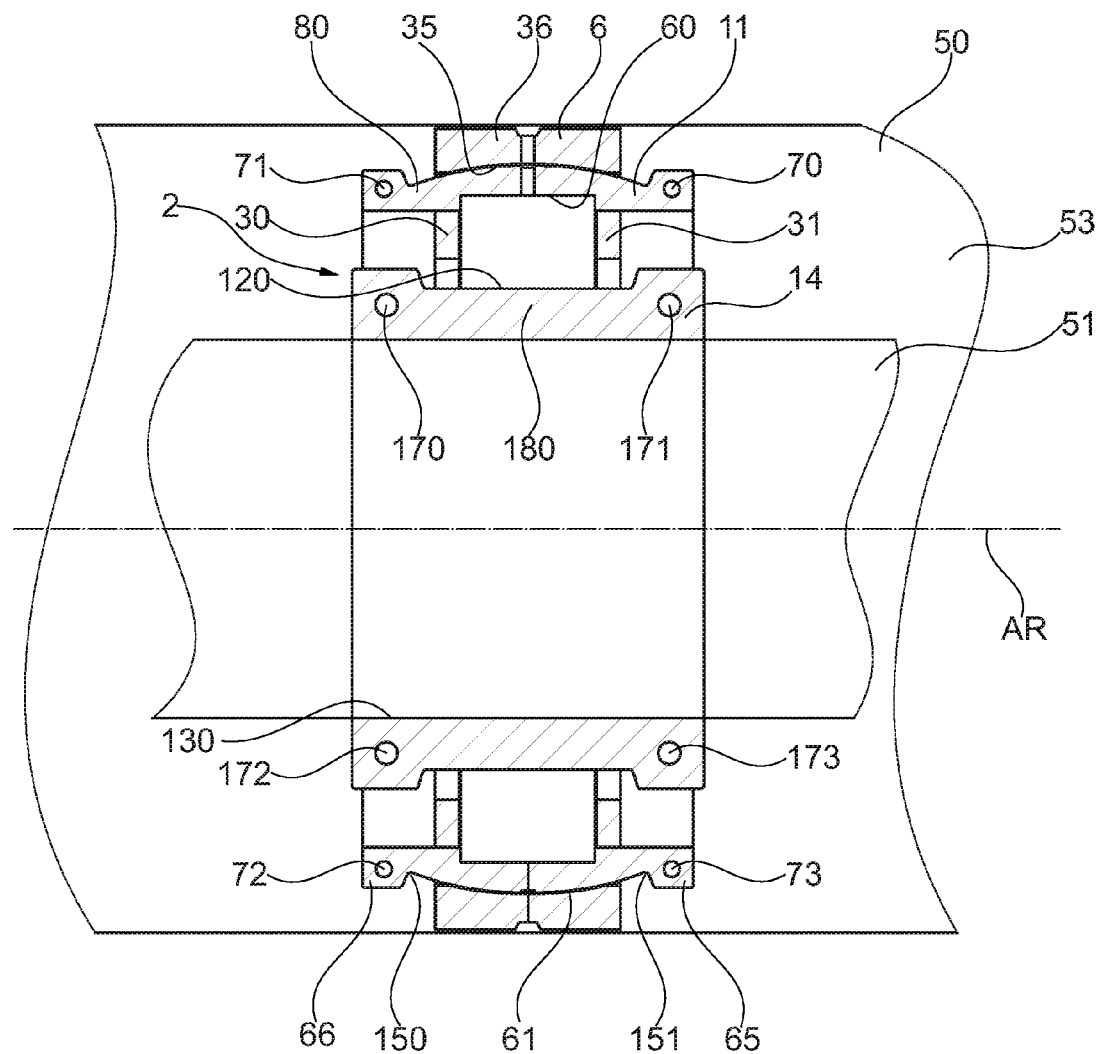
FIG. 5 is a view of the bearing, housing and shaft assembly of FIG. 4.
Figure 6:
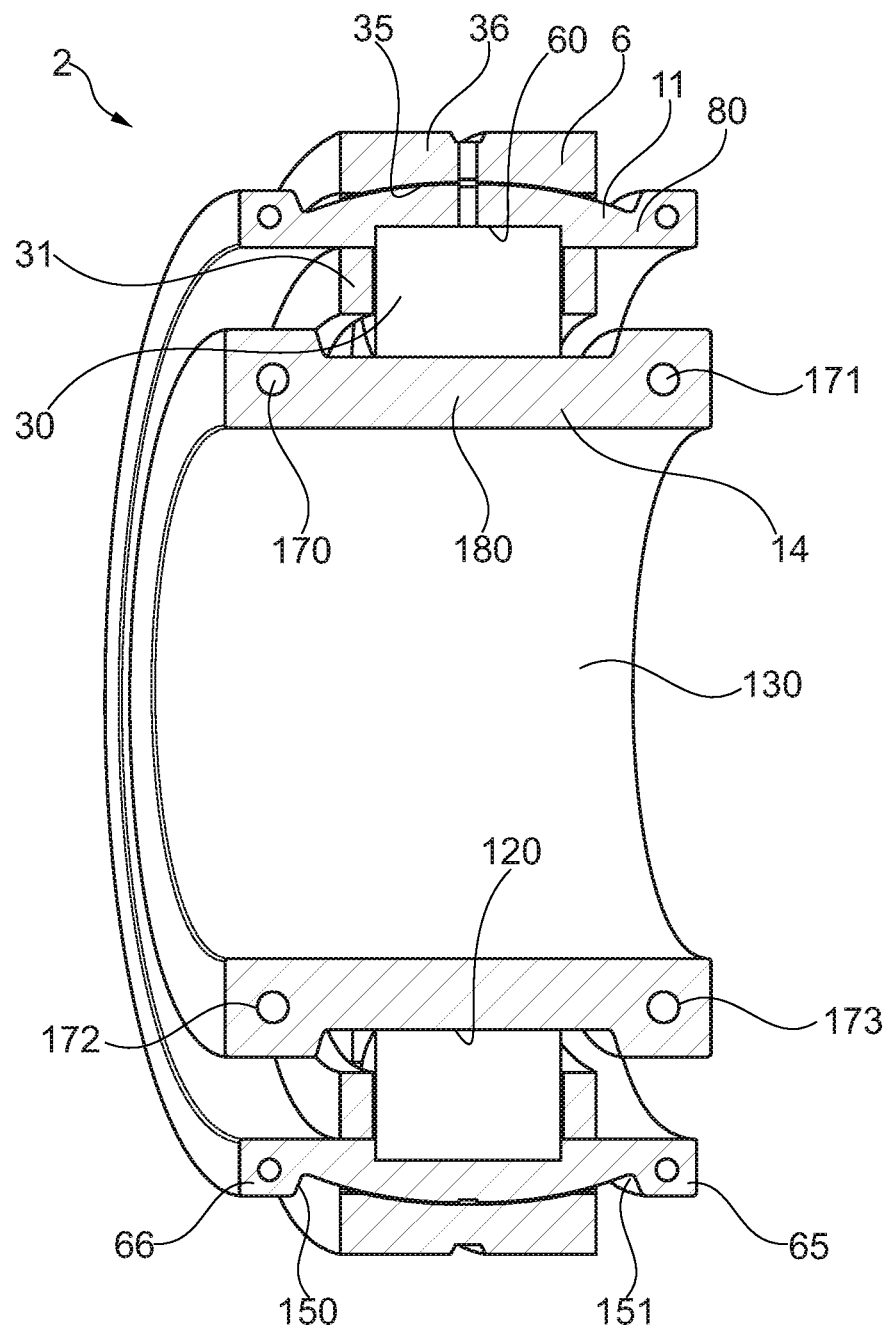
FIG. 6 is a perspective view of half of the bearing of FIG. 2, according to one example embodiment.
Figure 7:
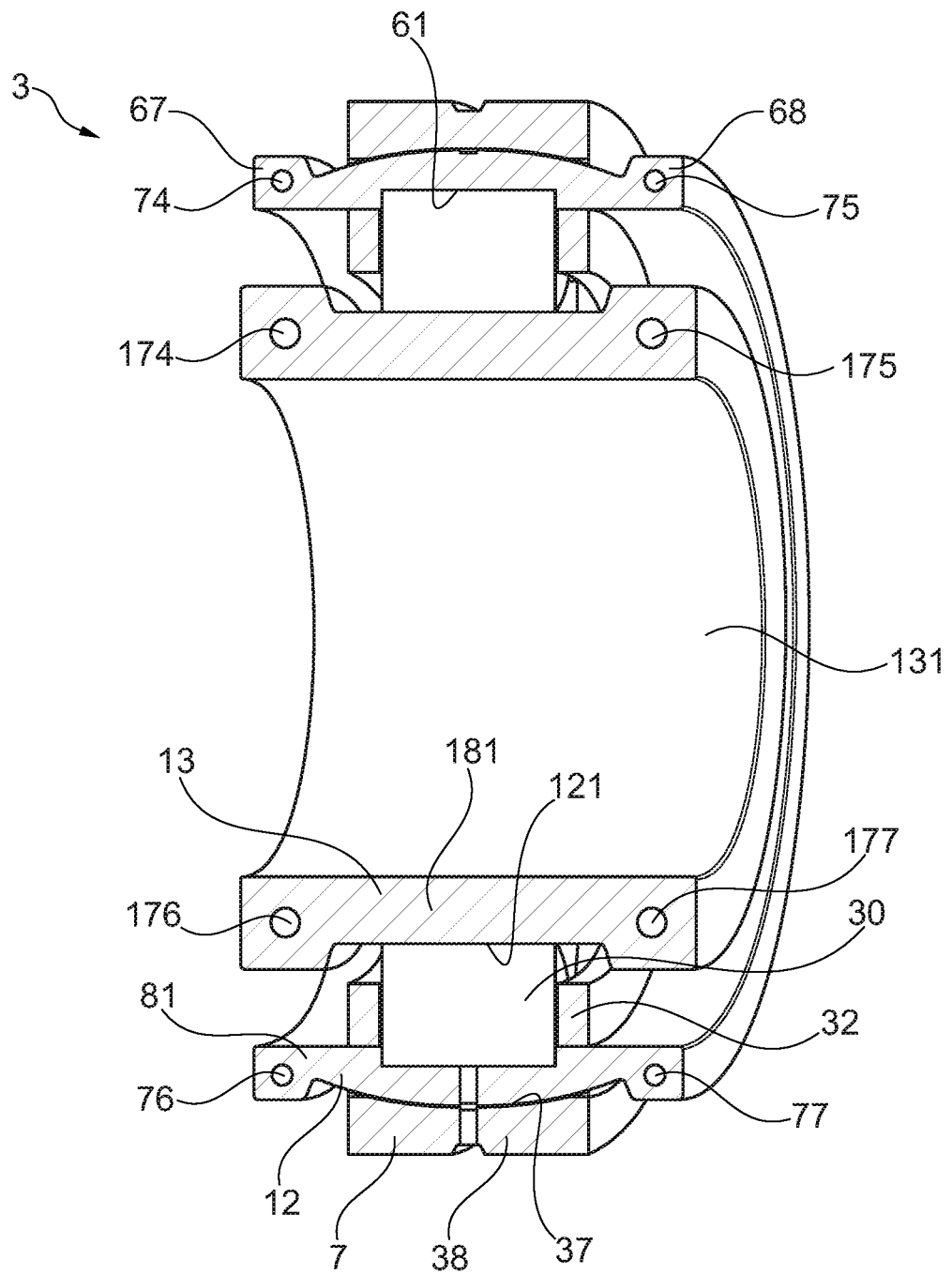
FIG. 7 is a perspective view of a second half of the bearing of FIG. 2, according to one example embodiment.

FIG. 2 is perspective view of split ring bearing 1 according to one example embodiment. FIG. 3 is a front view of bearing 1 of FIG. 2. FIG. 4 is a partial cross-sectional side view of assembly 100, including a side view of bearing 1 of FIG. 2 in an example housing 50 and shaft 51. FIG. 5 is a cross-sectional view of bearing 1 within assembly 100 of FIG. 4. FIG. 6 is a perspective view of first section 2 of split ring bearing 1 of FIG. 2, according to one example embodiment. FIG. 7 is a perspective view of second section 3 of split ring bearing 1. The following description should be viewed with respect to FIGS. 2-7. Bearing 1 includes central axis AR, first split outer ring 5 assembled around and axially aligned with second split outer ring 10, split inner ring 15 assembled within and axially aligned with second split outer ring 10, and roller elements 30 disposed within split cage halves 31 and 32 and between second split outer ring 10 and split inner ring 15. First split outer ring 5 includes: first section 6 having first self aligning surface 35 on an inner radial surface and first mounting surface 36 on an outer radial surface; and second section 7 having second self aligning surface 37 on an inner radial surface of the same geometry as first self aligning surface 35, and second mounting surface 38 on an outer radial surface of the same geometry as first mounting surface 36. First section 6 and second section 7 of first split outer ring 5 are at least partially circumferentially aligned such that first self-aligning surface 35 is at least partially circumferentially aligned with second self-aligning surface 37 and first mounting surface 36 is at least partially aligned with second mounting surface 38. In other words, first section 6 and second section 7 are not fixedly assembled, therefore, some relative misalignment between the two is contemplated in the present disclosure.

Second split outer ring 10 is assembled radially within and axially aligned with first split outer ring 5 and includes: first section 11 having first bearing raceway 60 on an inner radial surface, first self-aligning surface 61 on an outer radial surface and at least two retention shoulders 65, 66 at opposite axial ends of first section 11; second section 12 having second bearing raceway 62 on an inner radial surface, second self-aligning surface 63 on an outer radial surface and at least two retention shoulders 67, 68 at opposite axial ends of second section 12; each of retention shoulders 65, 66, 67, and 68 has a mounting structure, for example through holes 70 through 77 located at the parting or mating surfaces, for example surface 80 of section 11 and surface 81 of section 12, that circumferentially align and can be fixedly assembled, for example, using a bolt 90 and nut 91 fixation. It will be understood by one skilled in the art that any fastener may be used to fixedly assembly and align first section 11 and second section 12 such that first continuous bearing raceway including first and second bearing raceways 60 and 62, first continuous self-aligning surface including first and second self aligning surfaces 61 and 63 and at least two continuous retention shoulders including respectively retention shoulders 65,67 and 66,68, are formed. First self aligning surface 35 and second self aligning surface 37 have a convex cross sectional shape matching and aligning with a concave cross section shape of first continuous self-aligning surface combining surfaces 61 and 63 of second split outer ring 10. First continuous self-aligning surface is at least partially axially and radially aligned with first self aligning surface 35 and second self aligning surface 37 of first split outer ring 5 such that misalignment in assembly or operating of bearing 1 in assembly 100 may be compensated for by surfaces 35 and 37 moving relative to the first continuous self aligning surface 101. Unlike first split outer ring 5, second split outer ring 10 is fixedly assembled and all surfaces are aligned without relative motion or misalignment provided. Retention shoulders, for example 65 and 66 of first section 11 of second outer ring 10, are raised above self-aligning surfaces, for example surface 61 of first section 11, such that first outer ring sections, for example first section 6 are axially retained on second split outer ring 10. In the embodiment shown in FIGS. 2-6, particularly FIGS. 5 and 6, axial walls are formed, for example, wall 150 on retention shoulder 66 and wall 151 on retention shoulder 65, preventing relative movement of first split outer ring section 6 axially past that feature.

Split inner ring 15 is axially aligned and assembled radially within second split outer ring 10. Split inner ring 15 includes: first section 14 having first bearing raceway 120 on an outer radial surface and first shaft mounting surface 130 on an inner radial surface; and second section 13 having second bearing raceway 121 on an outer radial surface and second shaft mounting surface 131 on an inner radial surface. First and second sections 13, 14 has a mounting structure, for example through holes 170 through 177 located at the parting or mating surfaces, for example surface 180 of section 14 and surface 181 of section 13, that circumferentially align and can be fixedly assembled, for example, using a bolt 190 and nut 191 fixation. It will be understood by one skilled in the art that any fastener may be used to fixedly assemble and align first section 14 and second section 13 such that second continuous bearing raceway including first and second bearing raceways 120 and 121 and first continuous shaft mounting surface 210 including first and second shaft mounting surfaces 130 and 131 are formed.

Semi-circular cage halves 31 and 32 retain and guide rolling elements 30 within pockets, as is known in the art. Cage half 31 is disposed between second split outer ring first section 11 and split inner ring first section 14. Similarly cage half 32 is disposed between second split outer ring second section 12 and split inner ring second section 13. When second split outer ring 10 and split inner ring 15 are fixedly assembled using fasteners or clamps, as is known in the art, cage halves 31 and 32 are also circumferentially and axially aligned and run along first continuous bearing raceway including first and second bearing raceways 60 and 62 of second split outer ring 10 and second continuous bearing raceway including first and second bearing raceways 120 and 121 of split inner ring 15.

Bearing 1 is assembled into housing and shaft assembly 100 by joining together bearing subassemblies 2 and 3 on outer radial surface 52 of shaft 51 and assembled within inner radial surface 53 of housing 50. Bearing subassembly 2 and 3 are mirror images, therefore only bearing subassembly 2 will be described. Bearing subassembly 2 is formed from first outer ring first section 6, second outer ring first section 11, first cage half 31 with rolling elements 30 retained therein and disposed between second outer ring first section 11 and split inner ring first section 14. Bearing sub assemblies 2 and 3 are axially aligned on surface 52 of shaft 51 and circumferentially aligned with respect to each other. In this example embodiment subassemblies 2 and 3 are then fixedly connected, for example using fasteners (for example bolt 90 and nut 91) or clamps, and form a tight assembly or an interference fit between first continuous shaft mounting surface 210 and surface 52 of shaft 51. Depending on the arrangement of housing 50, bearing 1 and shaft 51 may be assembled within housing 50 with a slip fit between first split outer ring first section mounting surface 36, first outer ring second section mounting surface 38 and inner radial circumferential surface 53 of housing 50. Alternatively, housing 50 may be formed in halves and assembled or clamped around bearing 1.

Similarly, to disassemble bearing 1 from housing and shaft assembly 100, bearing 1 and shaft are removed from housing 50, and fasteners 90,91 are removed, allowing bearing subassemblies 2 and 3 to be removed from shaft 51.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

I claim:

1. A bearing comprising:
    a first split outer ring including:
        a first section having a first self aligning surface on an inner radial surface and a first mounting surface on an outer radial surface;
        a second section having a second self aligning surface on an inner radial surface and a second mounting surface on an outer radial surface; and,
        the first section and the second section at least partially circumferentially aligned such that the first self-aligning surface is at least partially circumferentially aligned with the second self-aligning surface and the first mounting surface is at least partially aligned with the second mounting surface;
    a second split outer ring assembled within the first split outer ring including:
        a first section having a first bearing raceway on an inner radial surface, a first self-aligning surface on an outer radial surface and at least two retention shoulders at opposite axial ends;
        a second section having a second bearing raceway on an inner radial surface, a second self-aligning surface on an outer radial surface and at least two retention shoulders at opposite axial ends;
        a plurality of fasteners joining the first section and the second section such that a first continuous bearing raceway, a first continuous self-aligning surface and at least two continuous retention shoulders are formed; and,
        the first continuous self-aligning surface at least partially aligned with the first split outer ring first and second self-aligning surfaces;
    a split inner ring axially aligned with the second split outer ring and assembled within the second split outer including:
        a first section having a first bearing raceway on an outer radial surface and a first shaft mounting surface on an inner radial surface;
        a second section having a second bearing raceway on an outer radial surface and a second shaft mounting surface on an inner radial surface; and
        a plurality of fasteners joining the first and second sections such that a second continuous bearing raceway is formed from the first and second section bearing raceways; and,
    a plurality of rolling elements retained by at least two circumferentially aligned semi-circular cage halves and disposed between the second split outer ring and the split inner ring.

2. The bearing of claim 1, wherein the first and the second sections of the first split outer ring are axially retained on the second split outer ring by the at least two continuous retention shoulders.

3. The bearing of claim 1, wherein the first continuous self-aligning surface has a convex contour that at least partially aligns with a concave contour on the second continuous self-aligning surface.

4. The bearing of claim 1, wherein the first section of the first split outer ring and the second section of the first split outer ring are not completely circumferential aligned.

5. A device comprising:
    a housing including an inner radial circumferential surface;
    a first split outer ring assembled within the housing and including:
        a first section having a first self aligning surface on an inner radial surface and a first mounting surface on an outer radial surface;
        a second section having a second self aligning surface on an inner radial surface and a second mounting surface on an outer radial surface; and,
        the first section and the second section at least partially circumferentially aligned such that the first self-aligning surface is at least partially circumferentially aligned with the second self-aligning surface and the first mounting surface is at least partially aligned with the second mounting surface;
    a second split outer ring assembled within the first split outer ring including:
        a first section having a first bearing raceway on an inner radial surface, a first self-aligning surface on an outer radial surface and at least two retention shoulders at opposite axial ends;
        a second section having a second bearing raceway on an inner radial surface, a second self-aligning surface on an outer radial surface and at least two retention shoulders at opposite axial ends;
        a plurality of fasteners joining the first section and the second section such that a first continuous bearing raceway, a first continuous self-aligning surface and at least two continuous retention shoulders are formed; and,
        the first continuous self-aligning surface at least partially aligned with the first split outer ring first and second self-aligning surfaces;

a split inner ring axially aligned with the second split outer ring and assembled within the second split outer including:
  a first section having a first bearing raceway on an outer radial surface and a first shaft mounting surface on an inner radial surface;
  a second section having a second bearing raceway on an outer radial surface and a second shaft mounting surface on an inner radial surface; and
  a plurality of fasteners joining the first and second sections such that a second continuous bearing raceway is formed from the first and second section bearing raceways;
a plurality of rolling elements retained by at least two circumferentially aligned semi-circular cage halves and disposed between the second split outer ring and the split inner ring; and
a shaft assembled within first continuous shaft mounting surface of the the split inner ring.

6. The device of claim 5, wherein the first split inner ring has a slip fit to the inner radial circumferential surface of the housing.

7. The device of claim 5, wherein the shaft has a tight fit to the inner radial circumferential surface of the split inner ring.

8. The device of claim 5, wherein the first and the second sections of the first split outer ring are axially retained on the second split outer ring by the at least two continuous retention shoulders.

9. The device of claim 5, wherein the first continuous self-aligning surface has a convex contour that at least partially aligns with a concave contour on the second continuous self-aligning surface.

10. The device of claim 5, wherein the first section of the first split outer ring and the second section of the first split outer ring are not completely circumferential aligned.

11. A device comprising:
a housing including an inner radial circumferential surface;
a first split outer ring assembled within the housing and including:
  a first section having a first self aligning surface on an inner radial surface and a first mounting surface on an outer radial surface;
  a second section having a second self aligning surface on an inner radial surface and a second mounting surface on an outer radial surface; and,
  the first section and the second section at least partially circumferentially aligned such that the first self-aligning surface is at least partially circumferentially aligned with the second self-aligning surface and the first mounting surface is at least partially aligned with the second mounting surface;
a second split outer ring assembled within the first split outer ring including:
  a first section having a first bearing raceway on an inner radial surface, a first self-aligning surface on an outer radial surface and at least two retention shoulders at opposite axial ends;
  a second section having a second bearing raceway on an inner radial surface, a second self-aligning surface on an outer radial surface and at least two retention shoulders at opposite axial ends;
  a plurality of fasteners joining the first section and the second section such that a first continuous bearing raceway, a first continuous self-aligning surface and at least two continuous retention shoulders are formed; and,
  the first continuous self-aligning surface at least partially aligned with the first split outer ring first and second self-aligning surfaces;
a split inner ring axially aligned with the second split outer ring and assembled within the second split outer including:
  a first section having a first bearing raceway on an outer radial surface and a first shaft mounting surface on an inner radial surface;
  a second section having a second bearing raceway on an outer radial surface and a second shaft mounting surface on an inner radial surface; and
  a plurality of fasteners joining the first and second sections such that a second continuous bearing raceway is formed from the first and second section bearing raceways;
a plurality of rolling elements retained by at least two circumferentially aligned semi-circular cage halves and disposed between the second split outer ring and the split inner ring; and
a shaft assembled within first continuous shaft mounting surface of the split inner ring;
wherein the first and the second sections of the first split outer ring are axially retained on the second split outer ring by the at least two continuous retention shoulders.

* * * * *